(12) United States Patent
Utz

(10) Patent No.: US 12,119,648 B2
(45) Date of Patent: Oct. 15, 2024

(54) METHOD FOR GENERATING AN INDUCTIVE REACTIVE POWER BY MEANS OF AN ELECTRICAL LOAD APPARATUS, ELECTRICAL LOAD APPARATUS, AND ELECTROLYSIS APPARATUS

(71) Applicant: Siemens Energy Global GmbH & Co. KG, Bayern (DE)

(72) Inventor: Peter Utz, Nuremberg (DE)

(73) Assignee: Siemens Energy Global GmbH &Co. KG, Bayern (GE)

( * ) Notice: Subject to any disclaimer, the term of this patent is extended or adjusted under 35 U.S.C. 154(b) by 457 days.

(21) Appl. No.: 17/623,389

(22) PCT Filed: May 26, 2020

(86) PCT No.: PCT/EP2020/064509
§ 371 (c)(1),
(2) Date: Dec. 28, 2021

(87) PCT Pub. No.: WO2021/008762
PCT Pub. Date: Jan. 21, 2021

(65) Prior Publication Data
US 2022/0416544 A1 Dec. 29, 2022

(30) Foreign Application Priority Data
Jul. 17, 2019 (EP) .................................... 19186743

(51) Int. Cl.
*H02J 3/18* (2006.01)
*H02M 7/155* (2006.01)
(52) U.S. Cl.
CPC ........... *H02J 3/1892* (2013.01); *H02M 7/155* (2013.01)

(58) Field of Classification Search
CPC .......... H02J 3/1892; H02J 3/18; H02M 7/155; Y02E 40/30
See application file for complete search history.

(56) References Cited

U.S. PATENT DOCUMENTS

| | | | |
|---|---|---|---|
| 2006/0114642 A1* | 6/2006 | Liu | H02J 3/1892 361/500 |
| 2012/0112713 A1* | 5/2012 | Kuehn | H02J 3/36 323/207 |

(Continued)

FOREIGN PATENT DOCUMENTS

| | | |
|---|---|---|
| CN | 201274399 Y | 7/2009 |
| CN | 202978290 U | 6/2013 |

(Continued)

OTHER PUBLICATIONS

PCT International Search Report and Written Opinion of International Searching Authority mailed Oct. 28, 2020 corresponding to PCT International Application No. PCT/EP2020/064509 filed May 26, 2020.

(Continued)

*Primary Examiner* — Ziaul Karim
(74) *Attorney, Agent, or Firm* — Wolter Van Dyke Davis, PLLC

(57) ABSTRACT

A method for generating an inductive reactive power for a public grid by an electrical load apparatus, in which, in a first operating mode of the electrical load apparatus, an alternating current of the public grid is transformed by a transformer device and the transformed alternating current is provided for an electrical load of the electrical load apparatus. In a second operating mode of the electrical load apparatus that is different from the first operating mode, the transformer device is short-circuited in a phase-controlled manner by a switching device of the electrical load apparatus, wherein the switching device is phase-controlled such that, depend- (Continued)

ing on a phase angle of the phase control of the switching device by the transformed alternating current, the inductive reactive power for the public grid is generated by the switching device.

12 Claims, 2 Drawing Sheets

(56) References Cited

U.S. PATENT DOCUMENTS

| | | | | |
|---|---|---|---|---|
| 2014/0327308 | A1* | 11/2014 | Cargile | H02M 5/12 |
| | | | | 307/31 |
| 2015/0073610 | A1* | 3/2015 | Schnetzka | G05B 15/02 |
| | | | | 700/287 |
| 2019/0049526 | A1* | 2/2019 | McAnelly | H02H 1/0007 |
| 2019/0312430 | A1* | 10/2019 | Williams | H02M 5/451 |

FOREIGN PATENT DOCUMENTS

| | | |
|---|---|---|
| DE | 102014010359 A1 | 2/2016 |
| GB | 2542194 A | 3/2017 |
| JP | H07104872 A | 4/1995 |
| RU | 2621068 C1 | 5/2017 |

OTHER PUBLICATIONS

Deng; "Design of Dynamic Reactive Power Compensation, Control System Based on Microcontroller"; Wuhan University of Technology; May 2016; English abstract on p. 5.

* cited by examiner

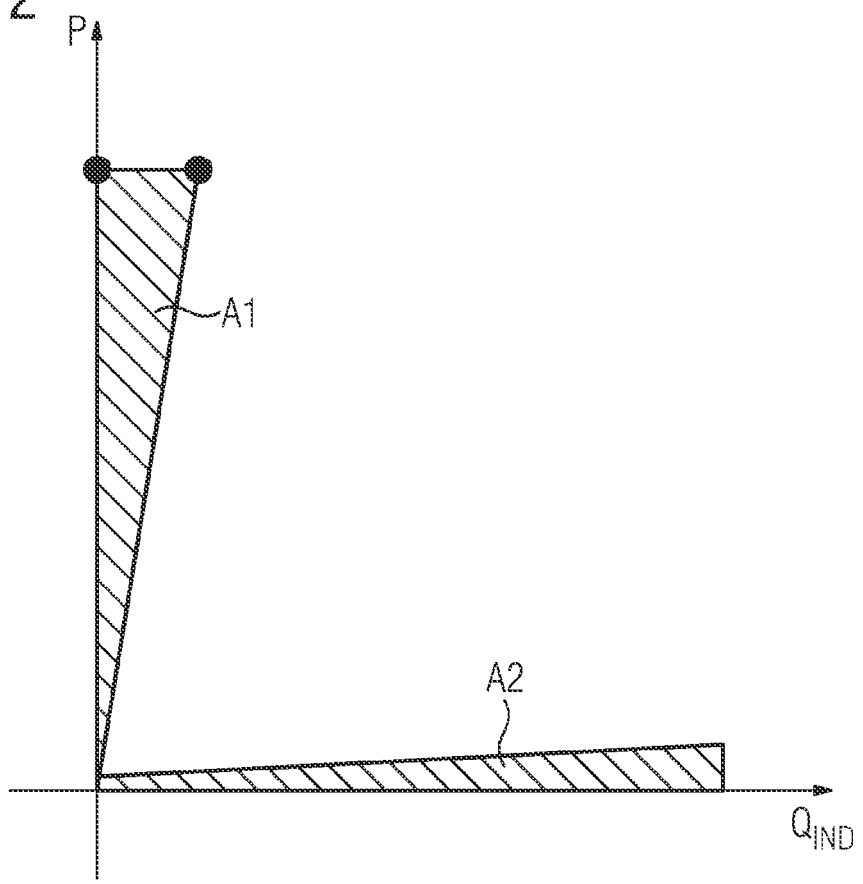

METHOD FOR GENERATING AN INDUCTIVE REACTIVE POWER BY MEANS OF AN ELECTRICAL LOAD APPARATUS, ELECTRICAL LOAD APPARATUS, AND ELECTROLYSIS APPARATUS

CROSS REFERENCE TO RELATED APPLICATIONS

This application is the US National Stage of International Application No. PCT/EP2020/064509 filed 26 May 2020, and claims the benefit thereof. The International Application claims the benefit of European Application No. EP19186743 filed 17 Jul. 2019. All of the applications are incorporated by reference herein in their entirety.

FIELD OF INVENTION

The invention relates to a method for generating an inductive reactive power for a public grid by means of an electrical consumer apparatus, in which, in a first operating mode of the electrical consumer apparatus, an AC current of the public grid is transformed by means of a transformer device, and the transformed AC current is provided for an electrical consumer of the electrical consumer apparatus. The invention also relates to an electrical consumer apparatus and an electrolysis apparatus.

BACKGROUND OF INVENTION

It is known from the prior art that, in the case of electrolysis apparatuses, which can also be referred to as electrolysis storage power plants, for example, high-power and high-voltage electrolysis is powered by line-commutated B6 bridges. In order to be able to regulate the electrolysis, a tap changer for coarse regulation and a thyristor switch for fine regulation are usually installed in the rectifier connected upstream. This regulation allows the operating point to be approached precisely, since all the electrolysis cells are connected in series. The rectifiers are in particular line-commutated and for fine control require inductive control reactive power that is very low compared to the active power. In the case of a normal set-up of electrolysis apparatuses, almost only active power can therefore be drawn and inductive reactive power can be provided to a small extent. Both are only achieved when the electrolysis apparatus is in operation and performs electrolysis, however.

RU 2 621 068 C1 discloses an apparatus for compensating for reactive power and melting ice, which contains electromagnetic, valve and switch parts, wherein the electromagnetic part is configured in the form of a three-phase controlled shunt reactor transformer with a three-phase secondary winding that is divided into two sections, wherein the valve part is in the form of three-phase rectifier bridges, which are connected to the outputs of these sections, on thyristors, and the commutator part is configured in the form of two single-pole and two bipolar isolating switches for short-circuiting the outputs of each of the bridges or for connecting them to the overhead lines.

CN 201 274 399 Y describes an apparatus in the technical field of supportive equipment for high- and low-voltage power supply and distribution systems and relates in particular to a DC high-current ice melting device with a static reactive power compensation function.

SUMMARY OF INVENTION

An object of the present invention is to provide a method, an electrical consumer apparatus and an electrolysis apparatus, by means of which inductive reactive power can additionally be generated for a public grid.

This object is achieved by a method, an electrical consumer apparatus and an electrolysis apparatus as claimed in the independent patent claims. Advantageous refinements are specified in the dependent claims.

One aspect of the invention relates to a method for generating an inductive reactive power for a public grid by means of an electrical consumer apparatus, in which, in a first operating mode of the electrical consumer apparatus, an AC current of the public grid is transformed by means of a transformer device, and the transformed AC current is provided for an electrical consumer of the electrical consumer apparatus.

In a second operating mode of the electrical consumer apparatus that is different to the first operating mode, provision is made for the transformer device to be short-circuited in a phase-controlled manner by means of a switching device of the electrical consumer apparatus, wherein the switching device is phase-controlled in such a way that the inductive reactive power is generated by means of the transformed AC current for the public grid by means of the switching device depending on a phase gating angle of the phase control of the switching device.

This makes it possible for inductive reactive power to be able to be fed back to the public grid in the second operating mode. In particular, the AC current of the public grid is therefore transformed both in the first operating mode and in the second operating mode. Therefore, an additional grid service can be provided for the public grid. In particular, this can result in an extension of the grid service of an already existing system, in particular of the electrical consumer apparatus, which is necessary especially in the case of weak medium-voltage grids. The costs of the switching device are in particular low compared to thyristor-controlled reactors and inductors hard-wired to the grid, for example.

In other words, provision is made for the inductive reactive power to be generated within the switching device or within the transformer device, and for it to be able to be fed back in turn to the public grid, by way of a short circuit on a secondary side of the transformer device, wherein the primary side is assigned to the public grid, and by way of phase-controlled clocking of this short circuit.

Provision is also made for the inductive reactive power to be additionally controlled by means of a tap changer of the transformer device. In particular, regulation can therefore be additionally achieved by way of the tap changer of the transformer device. In particular, as a result, the inductive reactive power can be controlled from a rated power of the transformer to the lowest stepped power of the transformer device. The inductive reactive power for the public grid can therefore additionally be regulated.

In accordance with an advantageous refinement, the switching device has a rectifier circuit and an isolating switch, wherein the isolating switch is closed to short-circuit the transformer device and the phase gating angle is controlled by means of the rectifier circuit by clocked actuation of the rectifier circuit. In particular, the isolating switch is arranged on a DC side of the rectifier circuit. In particular, the isolating switch is then permanently short-circuited for generating the inductive reactive power, that is to say in the second operating mode, wherein the phase control is clocked accordingly by the rectifier circuit via the phase gating angle. This makes it possible for the electrical consumer apparatus to be able to be in the form of an already existing storage power plant, in particular an electrolysis apparatus, for example. In this case, the rectifier circuit is already present to rectify the AC current from the grid for the electrolysis apparatus. It is then necessary only to additionally fit the isolating switch. The DC side is then short-circuited by means of the isolating switch in particular when the contactors of the electrolysis apparatus that can isolate the electrolysis apparatus on the DC side from the public grid are open, and the inductive reactive power is generated by way of the appropriate clocking of the rectifier circuit. As a result, the inductive reactive power can additionally be generated for the public grid in a simple manner in an already existing system.

It has also proved to be advantageous if the transformed AC current is phase-controlled by means of a six-pulse bridge circuit as the rectifier circuit. The six-pulse bridge circuit is also referred to as a B6C circuit. The B6C circuit is a controlled three-phase bridge that is used especially in the case of large loads, for example of over 5 MW, and that is a fully controlled three-phase bridge. In particular, the electrolysis apparatus can therefore be used as a storage power plant. In particular, this is implemented with six thyristors that allow voltage regulation by way of gating control, for example for continuously variable control of electrolysis cells of the electrolysis device. In particular, the six-pulse bridge circuit is already present in an electrolysis apparatus. Furthermore, the phase gating control can be implemented in a simple manner as a result. As a result, the inductive reactive power can be generated in the second operating mode in a simple yet reliable manner.

In a further advantageous refinement, the inductive reactive power is generated by means of the rectifier circuit in such a way that it corresponds to the installed apparent power of the transformer device. In particular, this makes it possible to provide inductive reactive power that can be just as high as the installed apparent power of the transformer device. In particular, this is achieved by way of the isolating switch additionally fitted downstream of the rectifier circuit. In particular, as a result, an additional grid service can be provided if the public grid requests this.

It is furthermore advantageous if the rectifier circuit is operated with a rated current of the rectifier circuit to generate the inductive reactive power. In particular, the DC side of the rectifier circuit is therefore short-circuited, wherein the rectifier circuit can then be regulated to the rated current. In particular, as a result, the P-Q graph of the electrical consumer apparatus can be extended by an operating range that primarily provides inductive reactive power for the public grid.

In a further advantageous refinement, the switching device is controlled with a phase gating angle of at least greater than 75°, in particular greater than 80°, in particular greater than 85°, in particular greater than 90°, in particular advantageously greater than 90°. This makes it possible for essentially pure inductive reactive power to be fed back to the public grid. As a result, the additional grid service can be provided if the grid operator requests this. In particular, solely inductive reactive power is generated as a result of the phase gating angle of greater than 90°. As a result, no active power is fed back to the grid, but only inductive reactive power.

A further aspect of the invention relates to an electrical consumer apparatus for generating an inductive reactive power, having at least one transformer device and having a switching device, wherein the electrical consumer apparatus is designed to carry out a method in accordance with the preceding aspect.

Yet another aspect of the invention relates to an electrolysis apparatus for carrying out electrolysis in a first operating mode and for generating an inductive reactive power for a public grid in a second operating mode, having at least one electrolysis device and having an electrical consumer apparatus in accordance with the preceding aspect.

In accordance with an advantageous refinement of the electrolysis apparatus, the electrolysis apparatus has a tap changer for coarse regulation of the electrolysis and a thyristor switch for fine regulation of the electrolysis in the first operating mode.

One independent aspect of the invention relates to a method for generating an inductive reactive power for a public grid by means of an electrolysis apparatus, in which, in a first operating mode of the electrolysis apparatus, an AC current of the public grid is transformed by means of a transformer device of the electrolysis apparatus on an AC side of the electrolysis apparatus, and the transformed AC current is provided at an input side of a rectifier circuit of the electrolysis apparatus and the transformed AC current is converted into a DC current by means of the rectifier circuit and the DC current is provided on an output side of the rectifier circuit of an electrolysis apparatus for electrolysis on a DC side of the electrolysis apparatus. Provision is made, in a second operating mode of the electrolysis apparatus that is different to the first operating mode, for an isolating switch of the electrolysis apparatus to be closed on the output side and for the output side to be short-circuited by means of the isolating switch and for the inductive reactive power for the public grid to be generated by means of the rectifier circuit and by means of the transformed AC current.

Advantageous refinements of the method can be considered to be advantageous refinements of the electrical consumer apparatus and of the electrolysis apparatus. In this respect, the electrical consumer apparatus and the electrolysis apparatus have concrete features which make it possible to carry out the method or an advantageous refinement thereof.

Further features and advantages can be gathered from the following description with reference to the attached figures. In the figures, identical reference signs denote identical features and functions. The exemplary embodiments serve merely to explain the invention and are not intended to restrict it.

BRIEF DESCRIPTION OF THE DRAWINGS

In the figures:

FIG. 2 shows a schematic reactive power/active power graph of an embodiment of the electrolysis apparatus.

DETAILED DESCRIPTION OF INVENTION

Figure 1:
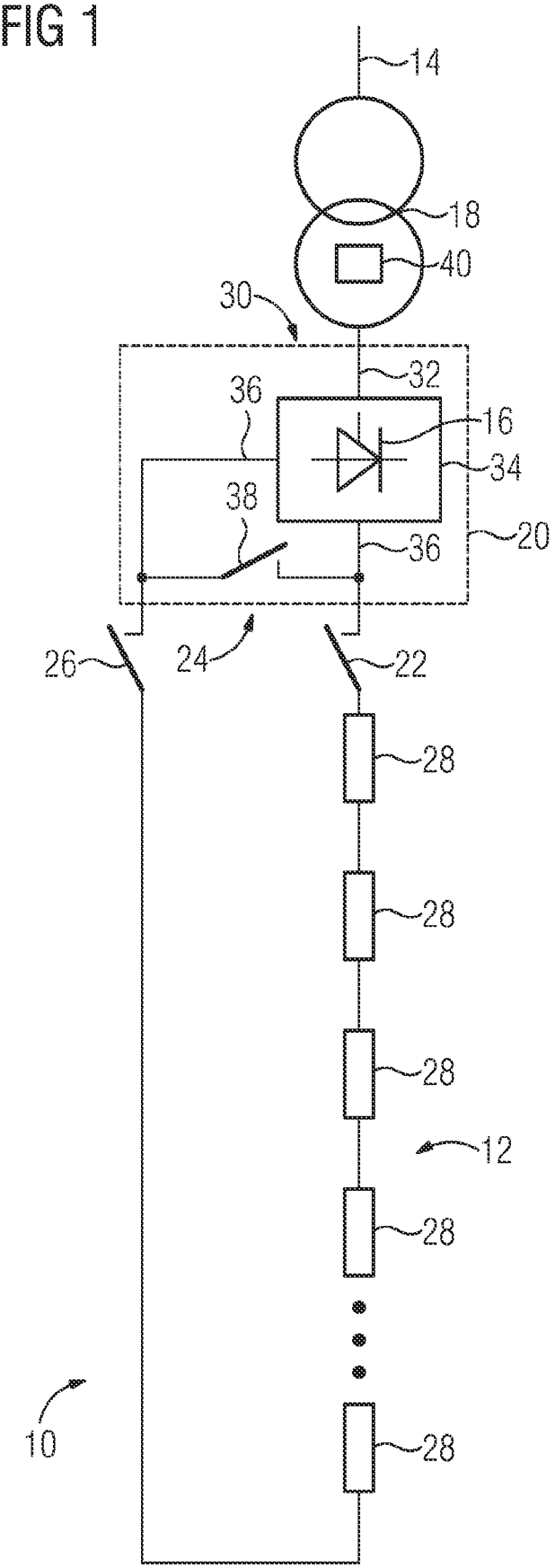
FIG. 1 shows a schematic view of an embodiment of an electrolysis apparatus with an embodiment of an electrical consumer apparatus.

FIG. 1 shows a schematic view of an embodiment of an electrolysis apparatus 10 with an embodiment of an electrical consumer apparatus 12. In this exemplary embodiment, the electrical consumer apparatus 12 is in particular in the form of an electrolysis device. The electrolysis apparatus 10 is designed for carrying out electrolysis in a first operating mode and for generating an inductive reactive power $Q_{IND}$ (FIG. 2) for a public grid 14 in a second operating mode, and has at least one tap changer for coarse regulation of the electrolysis and one thyristor switch 16 for fine regulation of the electrolysis in the first operating mode. The electrical consumer apparatus 12 also has at least one transformer device 18 and a switching device 20. The electrolysis apparatus 10 also has a first switching element 22 for isolating a DC side 24 of the electrolysis apparatus 10 and a second switching element 26 for isolating the DC side 24 from the public grid 14.

In particular, an AC current is provided by the public grid 14. In particular, the present FIG. 1 shows only one phase of the AC current. The method can additionally also be operated with three AC phases from the public grid 14 the electrolysis apparatus 10.

In the method for generating the inductive reactive power $Q_{IND}$ for the public grid 14 by means of the electrical consumer apparatus 12, in a first operating mode of the electrical consumer apparatus 12, the AC current of the public grid 14 is transformed by means of the transformer device 18, and the transformed AC current is provided for an electrical consumer 28 of the electrical consumer apparatus 12.

In a second operating mode of the electrical consumer apparatus 12 that is different to the first operating mode, provision is made for the transformer device 18 to be short-circuited in a phase-controlled manner by means of the switching device 20 of the electrical consumer apparatus 12, wherein the switching device 20 is phase-controlled in such a way that the inductive reactive power $Q_{IND}$ is generated by means of the transformed AC current for the public grid 14 by means of the switching device 20 depending on a phase gating angle of the phase control of the switching device 20.

The present exemplary embodiment shows, in particular, a method for generating the inductive reactive power $Q_{IND}$ for the public grid 14 by means of the electrolysis apparatus 10, in which, in a first operating mode of the electrolysis apparatus 10, AC current of the public grid 14 is transformed by means of the transformer device 18 of the electrolysis apparatus 10 on an AC side 30 of the electrolysis apparatus 10, and the transformed AC current is provided to an input side 32 of a rectifier circuit 34 of the electrolysis apparatus 10 and the transformed AC current is converted into a DC current by means of the rectifier circuit 34 and the DC current is provided on an output side 36 of the rectifier circuit 34 for the electrolysis device for electrolysis on the DC side 24 of the electrolysis apparatus 10. In this case, provision is in particular made, in a second operating mode of the electrolysis apparatus 10 that is different to the first operating mode, for an isolating switch 38 of the electrolysis apparatus 10 to be closed on the output side 36 and for the output side 36 to be short-circuited by means of the isolating switch 38 and for the inductive reactive power $Q_{IND}$ to be generated for the public grid 14 by means of the rectifier circuit 34 and the transformed AC current.

In other words, FIG. 1 shows in particular that the switching device 20 can have the rectifier circuit 34 and the isolating switch 38, wherein the isolating switch 38 is closed to short-circuit the transformer device 18 and the phase gating angle is controlled by means of the rectifier circuit 34 by clocked actuation of the rectifier circuit 34.

In particular, provision can be made in this case for the rectifier circuit 34 to be provided as a six-pulse bridge circuit and in particular as a B6C circuit. Therefore, provision is made for the transformed AC current to be phase-controlled by means of the six-pulse bridge circuit as the rectifier circuit 34.

Provision is also in particular made for the inductive reactive power $Q_{IND}$ to be generated by means of the rectifier circuit 34 in such a way that it corresponds to the installed apparent power of the transformer device 18. The rectifier circuit 34 is operated in particular with a rated current of the rectifier circuit 34 to generate the inductive reactive power $Q_{IND}$.

Provision can also be made for the inductive reactive power $Q_{IND}$ to be additionally controlled by means of a tap changer of the transformer device 18.

In particular, provision can be made for the switching device 20 to be controlled with a phase gating angle of at least greater than 75°, in particular greater than 80°, in particular greater than 85°, in particular greater than 90°.

In particular, the invention therefore makes use of the fact that the electrolysis apparatus 10 has the line-commutated rectifier, in other words the rectifier circuit 34, for high-power and high-voltage electrolysis. In order to be able to regulate the electrolysis, the tap changer for coarse regulation and the thyristor switch for fine regulation are installed in the rectifier circuit 34 connected upstream. This regulation allows the operating point to be approached precisely, since all the electrolysis cells that correspond to the electrical consumers 28 in the present exemplary embodiment are connected in series. Since the rectifier circuit 34 is line-commutated, for fine control it requires inductive control reactive power that is very low compared to the active power. In the case of the normal electrolysis set-up, power P (FIG. 2) can be drawn and inductive reactive power $Q_{IND}$ can be provided to a small extent. Both of these only function when the electrolysis is in operation, however. Additional grid services therefore do not need to be provided in the first operating mode.

In order to now provide an additional grid service for the public grid 14 even when there is no electrolysis taking place, the inductive reactive power $Q_{IND}$ that in particular can be just as high as the installed apparent power of the transformer device 18 is provided when the switching elements 22, 26 are open and, in the following exemplary embodiment, when the isolating switch 38 is closed. The isolating switch 38 is therefore installed downstream of the rectifier circuit 34. Said isolating switch short-circuits the DC side 24; the rectifier circuit 34 can therefore be driven to the rated current in a regulated manner. Since this occurs with a phase gating angle of approximately 90°, however, only pure reactive power $Q_{IND}$ is fed back to the public grid 14. As a result, with this modification, an additional grid service can be provided if the grid operator requests this.

Therefore, the inductive reactive power $Q_{IND}$ can be provided by simply fitting the isolating switch 38 in an already existing system of the electrolysis apparatus 10, which system can be used especially in the case of weak medium voltages. The costs of the isolating switch 38 are extremely low in comparison to thyristor-controlled reactors and inductors hard-wired to the grid that are used in accordance with the prior art, for example. Therefore, the isolating switch 38 is proposed, which closes if necessary, that is to say in the second operating mode, while the two existing switching elements 22, 26 open for electrolysis.

FIG. 2 shows a schematic view of a reactive power/active power graph. In particular, the inductive reactive power $Q_{IND}$ is plotted on the abscissa and the active power P is plotted on the ordinate. During electrolysis, the electrolysis apparatus 10 in particular has a first operating range A1. In other words, during electrolysis, virtually only active power P is generated, and low inductive reactive power $Q_{IND}$. In particular, the operating range A1 therefore shows the first operating mode of the electrolysis apparatus 10. The electrolysis apparatus 10 is extended by a second operating range A2 by closing the isolating switch 38, in other words by short-circuiting the DC side 24. In the second operating range A2, virtually only inductive reactive power $Q_{IND}$ is generated, and only low active power P.

Overall, the invention shows extended provision of inductive reactive power $Q_{IND}$ in the form of grid system power from electrolysis.

The invention claimed is:

1. A method for generating an inductive reactive power for a public grid by means of an electrical consumer apparatus, the method comprising:
   in a first operating mode of the electrical consumer apparatus, transforming an AC current of the public grid by means of a transformer device, and providing the transformed AC current for an electrical consumer of the electrical consumer apparatus,
   in a second operating mode of the electrical consumer apparatus that is different to the first operating mode, short-circuiting the transformer device in a phase-controlled manner by means of a switching device of the electrical consumer apparatus, wherein the switching device is phase-controlled in such a way that the inductive reactive power is generated by means of the transformed AC current for the public grid by means of the switching device depending on a phase gating angle of the phase control of the switching device, and
   additionally controlling the inductive reactive power by means of a tap changer of the transformer device.

2. The method as claimed in claim 1,
   wherein the switching device has a rectifier circuit and an isolating switch,
   wherein the isolating switch is closed to short-circuit the transformer device and the phase gating angle is controlled by means of the rectifier circuit by clocked actuation of the rectifier circuit.

3. The method as claimed in claim 2,
   wherein the transformed AC current is phase-controlled by means of a six-pulse bridge circuit as the rectifier circuit.

4. The method as claimed in claim 3,
   wherein the inductive reactive power is generated by means of the rectifier circuit in such a way that it corresponds to an installed apparent power of the transformer device.

5. The method as claimed in claim 4,
   wherein the rectifier circuit is operated with a rated current of the rectifier circuit to generate the inductive reactive power.

6. The method as claimed in claim 1,
   wherein the switching device is controlled with a phase gating angle of at least greater than 75°.

7. The method as claimed in claim 6,
   wherein the phase gating angle is greater than 80°.

8. The method as claimed in claim 6,
   wherein the phase gating angle is greater than 85°.

9. The method as claimed in claim 6,
   wherein the phase gating angle is greater than 90°.

10. An electrical consumer apparatus for generating an inductive reactive power, comprising:
    at least one transformer device, and
    a switching device,
    wherein the electrical consumer apparatus is designed to carry out a method as claimed in claim 1.

11. An electrolysis apparatus for carrying out electrolysis in a first operating mode and for generating an inductive reactive power for a public grid in a second operating mode, comprising:
    at least one electrolysis device,
    wherein the at least one electrolysis device comprises the electrical consumer apparatus as claimed in claim 10.

12. The electrolysis apparatus as claimed in claim 11,
    wherein the electrolysis apparatus has a tap changer for coarse regulation of the electrolysis and a thyristor switch for fine regulation of the electrolysis in the first operating mode.

* * * * *